Aug. 27, 1968     C. A. DE LUCIA     3,398,581

STABILIMETER

Filed Sept. 6, 1966

INVENTOR,
CLEMENT A. DELUCIA
BY

ATTORNEY

United States Patent Office 3,398,581
Patented Aug. 27, 1968

3,398,581
STABILIMETER
Clement A. De Lucia, 1 Walnut St.,
Jamestown, R.I. 02835
Filed Sept. 6, 1966, Ser. No. 577,349
10 Claims. (Cl. 73—379)

My present invention relates to a motion measuring apparatus and more particularly to a type of apparatus known as a stabilimeter.

The principal object of the present invention is to provide a device for measuring the motion or activity of a living being.

Another object of the present invention is to provide a motion or activity measuring device which will give accurately repeatable readings, the device suppressing twisting movements which occur because of side to side movements, due to the mechanical design and electrical sensing configuration.

Another object of the present invention is to provide a motion measuring device which is fairly simple in construction and easy and economical to manufacture and assemble.

Another object of the present invention is to provide a motion measuring device which is compatible with most conventional recording mechanisms.

With the above and other objects and advantageous features in view, my invention consists of a novel arrangement of parts more fully disclosed in the detailed description following, in conjunction with the accompanying drawings, and more particularly defined in the appended claims.

It has been found desirable to provide a means for the measurement of reaction or motor processes of babies, small animals and other living things for diagnosis or research purposes. The mechanical reaction of a living organism to optical, acoustical, thermal or electrical stimulation may be significant. The reaction to certain foods or other irritants may be important. Various methods have been used to provide records of such motions including motion pictures and mechanical devices. Accuracy has been difficult to maintain because of various resultant forces caused by certain movements of an infant or other animal. The present invention is designed to provide a simple mechanical device having an electrical sensing system which provides a highly accurate reading of the subject's motion and which is provided with a circuit which is designed to cancel out twisting movements which occur as a result of a side to side movement rather than a vertical movement of the subject.

Figure 1:
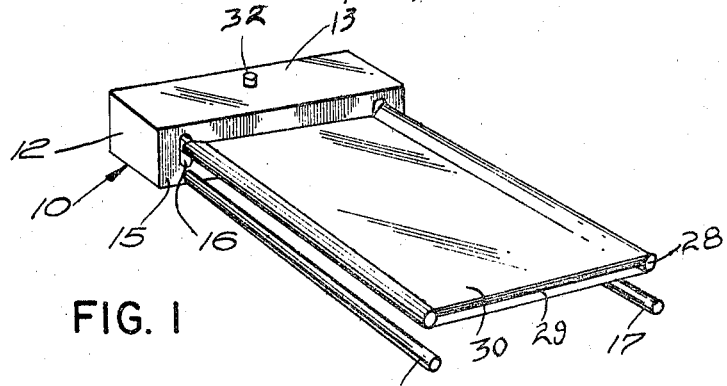
FIG. 1 is a perspective view of a stabilimeter embodying my present invention.

Referring more in detail to the drawings illustrating my invention, the device consists of a rectangular housing 10 having a bottom 11, side walls 12, a top wall 13, a rear wall 14 and a front wall 15. The front wall 15 is provided with spaced parallel vertically positioned slots 16 adjacent each end, see FIG. 1. The device illustrated is designed for laboratory use to handle an infant or similar sized being with a maximum weight of approximately nineteen pounds. Stability to the base is provided by a pair of spaced parallel aluminum tubes 17 which are anchored in the base just below the slots 16 as shown in FIGS. 1 and 3. The tubes 17 are approximately twenty-seven inches long with approximately six inches extending into the base as shown in FIG. 3 and being anchored thereto by means of rivets or bolts 18. I now provide a length of rectangular tubing 19 approximately an inch square and mounted on the rear wall 14 adjacent the upper end thereof as shown in FIG. 3. The mounting may be in the form of rivets or bolts 20 extending through the rear wall and the tubing from a point adjacent each end. The length of the tubing 19 is slightly less than the length of the rear wall 14 or housing 10, leaving a small space at each end as shown in FIG. 2.

I now provide a second length of rectangular tubing 21 in spaced parallel relation to the tubing 19 and attached thereto adjacent each end by flat, tempered steel, leaf springs approximately 1/64" thick. As can be seen in FIGS. 2 and 3, the leaf spring 22 extends from one end of the tubing 19 across the top thereof to the adjacent end of the tubing 21. The spring 22 is fastened to the tops of the tubings 19 and 21 by rectangular plates 23 bolted or riveted through the tubing and spring as shown in FIGS. 2 and 3. At the opposite end the tubings 19 and 21 are connected by a similar spring 24 fastened by rectangular plates 25. Now viewing FIG. 3, both ends of the tubings 19 and 21 are provided with identical springs on the bottom of the tubings. For example, opposite the spring 22 is a lower leaf spring 26 in spaced form and in parallel relation to the spring 22 and fastened to the bottom of the tubings 19 and 21 by rectangular plates 27. Similarly, another spring is mounted in spaced parallel relation to the spring 24 not shown.

Figure 2:
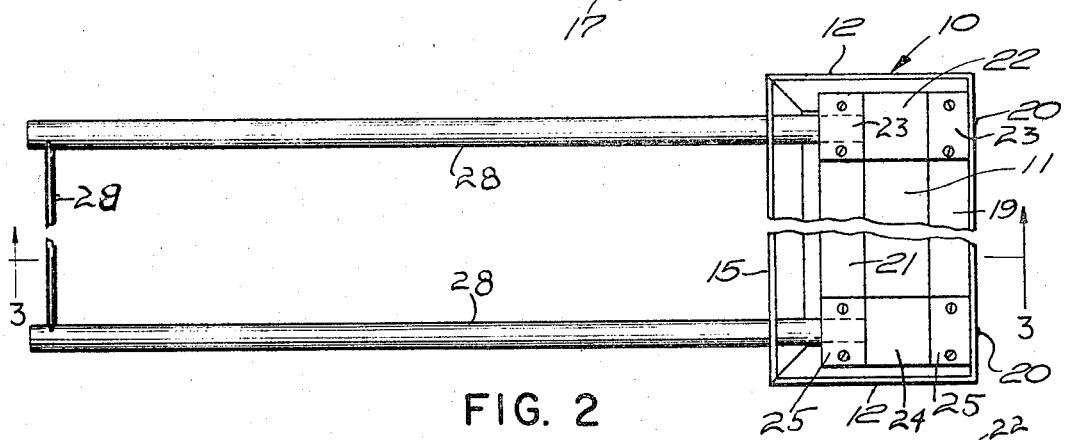
FIG. 2 is a top plan view thereof.
Figure 3:
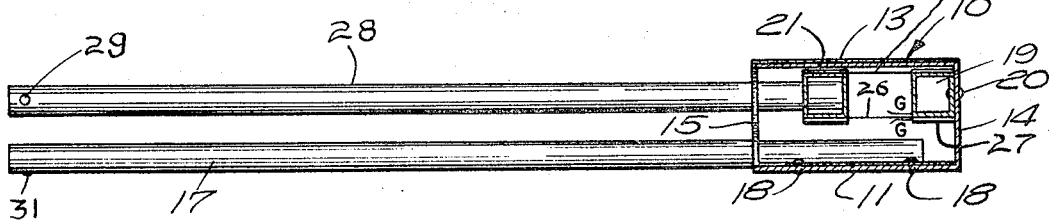
FIG. 3 is a section taken on line 3—3 on FIG. 2.

I now provide a pair of spaced parallel aluminum tubes 28 each mounted at their inner end in the rectangular tubing 21, see FIGS. 2 and 3, and extending forwardly through the slots 16 of the housing as shown in FIG. 1. Adjacent the outer ends, the tubings 28 are connected by a cross rod 29 for rigidity and spacing. The tubings 28 are covered by a fabric sleeve 30 which may be made of canvas or similar material and which can be slipped off the tubing and laundered. With the parts thus assumbled the device is braced on the lower tubes 17 which may be provided with depending rounded portions 31 adjacent their forward end so that they will be parallel to the table or other surface. The tubes 28 extend directly over the tubes 17 in spaced parallel relation. It is thus obvious that any weight positioned on the sleeve 30 will cause deflection in the springs 22, 24 and 26. Movement of the person or organism on the sleeve 30 will thus be reflected in the deflection of the springs. This is measured by the arrangement illustrated in FIGS. 3, 4 and 5.

Figure 4:
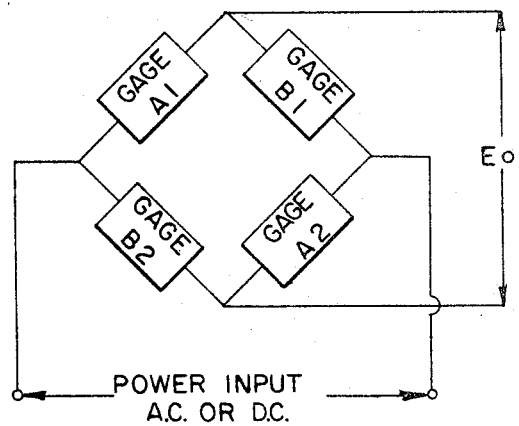
FIG. 4 is a diagram of the electrical sensing hook-up.
Figure 5:
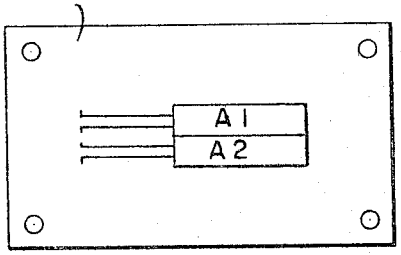
FIG. 5 is an enlarged plan view of one of the springs showing the mounting of the sensing gages.

On top of the spring 26 I provide a pair of strain gages A1 and A2 in side by side relationship. On the bottom of the spring 26, directly opposite the gages A1 and A2 I provide a similar pair of side by side gages B1 and B2. The gages A1, A2, B1, B2 are then hooked up in a bridge as illustrated in FIG. 4. That is, one connection from the gage A1 is connected to the gage B1 and the other connection from the gage A1 is connected to the gage B2. Similarly, one connection from the gage A2 is connected to the other connection of the gage B2 and the other connection of the gage A2 is connected to the other connection of the gage B1. An output plug 32 may be positioned in the top of the housing for attaching any type of conventional recording device. The above arrangement of the strain gages will convert the spring deflection into an electrically measurable parameter. The bridge arrangement is such that it will cancel out twisting movements that may occur as the result of side to side movement of the subject.

In use, the subject, usually an infant, is placed on the sleeve 30 and the instruments are then balanced to compensate for the weight of the infant. Thereafter, any additional movement of the infant will be detected by the strain gages and transmitted to a recording system. The device thus provides, a practical "activity" measuring instrument. It is easy and simple to manufacture and assemble. The type of illustrated mounting, which cancels out the side to side movement is superior to any mounting which requires the measurement of the four points of suspension usually used. The construction is economical and does not require any complicated parts.

While I have illustrated and described the use of strain gages, it should be understood that any equivalent device for detecting the spring deflection may be used. Other advantages of the present invention will be readily apparent to a person skilled in the art.

I claim:

1. A stabilimeter comprising a rectangular housing having bottom, top, side, rear and front walls, a pair of spaced parallel lower rods extending horizontally from said front wall, said rods extending into said housing along said bottom wall and being fastened to said bottom wall, said front wall having a vertical slot above each of said rods, an upper rod extending horizontally from said housing through each of said slots in spaced parallel relation, means on said upper rods for supporting a subject for examination, means in said housing for supporting said upper rods, said rod supporting means being responsive to movement of the subject, and means for sensing and measuring the degree of response of said rod supporting means.

2. A stabilimeter as in claim 1, wherein said upper and lower rods comprise hollow aluminum tubes, said upper tubes being connected by a transverse rod adjacent their free ends, and a cloth sleeve extending between said upper rods to form said subject supporting means.

3. A stabilimeter as in claim 1, wherein said upper rod supporting means comprises a pair of spaced parallel members connected by leaf springs, one of said members being mounted in said housing, said upper rods being mounted in the other of said members.

4. A stabilimeter as in claim 1, wherein said upper rod supporting means comprises a rectangular tube mounted along the upper rear wall in said housing, a second rectangular tube positioned in spaced parallel relation in front of said mounted tube, and a broad flat leaf spring mounted across the top and bottom of said rectangular tubes adjacent their ends, said leaf springs supporting said second tube transversely in said housing, said upper rods extending into said second tube and being mounted therein.

5. A stabilimeter as in claim 1, wherein said sensing means includes a plurality of strain gages mounted above and below said upper rod supporting means.

6. A stabilimeter as in claim 5, wherein said sensing means includes two upper and two lower strain gages connected to form on electrical bridge wherein each gage is connected to the two gages on the opposite side.

7. A stabilimeter as in claim 3, wherein said sensing means includes a plurality of strain gages mounted above and below one of said leaf springs.

8. A stabilimeter as in claim 7, wherein said sensing means includes two upper and two lower strain gages connected to form an electrical bridge wherein each gage is connected to the two gages on the opposite side.

9. A stabilimeter as in claim 4, wherein said sensing means includes a plurality of strain gages mounted above and below one of said bottom leaf springs.

10. A stabilimeter as in claim 9, wherein said sensing means includes two upper and two lower strain gages connected to form an electrical bridge wherein each gage is connected to the two gages on the opposite side.

References Cited
UNITED STATES PATENTS

| | | | |
|---|---|---|---|
| 2,802,660 | 8/1957 | Williams | 177—211 XR |
| 2,860,514 | 11/1958 | Lauru | 73—379 |
| 3,090,226 | 5/1963 | Corti et al. | 73—141 |
| 3,360,062 | 12/1967 | Dotter | 177—144 |

RICHARD C. QUEISSER, *Primary Examiner.*

CHARLES A. RUEHL, *Assistant Examiner.*